United States Patent
Lu et al.

(10) Patent No.: US 10,508,893 B2
(45) Date of Patent: Dec. 17, 2019

(54) FLATNESS DETECTOR

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Li-Chin Lu, New Taipei (TW); Jian-Hua Xiang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 177 days.

(21) Appl. No.: 15/836,935

(22) Filed: Dec. 11, 2017

(65) Prior Publication Data

US 2019/0094002 A1 Mar. 28, 2019

(30) Foreign Application Priority Data

Sep. 22, 2017 (CN) .......................... 2017 1 0866669

(51) Int. Cl.
*G01B 3/22* (2006.01)
*G01B 5/28* (2006.01)

(52) U.S. Cl.
CPC ............... *G01B 3/22* (2013.01); *G01B 5/285* (2013.01)

(58) Field of Classification Search
CPC .................................................... G01B 3/22
USPC .......................................................... 33/533
See application file for complete search history.

(56) References Cited

U.S. PATENT DOCUMENTS

| | | | | |
|---|---|---|---|---|
| 5,133,135 A * | 7/1992 | Durfee, Jr. | ............. | G01B 5/245 33/427 |
| 2001/0009069 A1* | 7/2001 | Ishii | ...................... | G01B 5/163 33/199 R |
| 2007/0180721 A1* | 8/2007 | Furukawa | ............... | G01B 5/252 33/543 |
| 2009/0094851 A1* | 4/2009 | Xiao | ........................ | G01B 3/22 33/832 |
| 2012/0246955 A1* | 10/2012 | Smith | ...................... | G01B 3/22 33/517 |
| 2013/0067760 A1* | 3/2013 | Husted | ..................... | G01B 5/06 33/784 |
| 2013/0232802 A1* | 9/2013 | Hayashi | ................... | G01B 5/00 33/501 |
| 2013/0247403 A1* | 9/2013 | Hayashida | ............... | G01B 3/22 33/505 |
| 2015/0330759 A1* | 11/2015 | Ferreira | .................. | G01B 21/20 33/533 |
| 2019/0033050 A1* | 1/2019 | Liu | ...................... | G01B 5/0025 |
| 2019/0162516 A1* | 5/2019 | Abe | ........................ | G01B 5/207 |

* cited by examiner

*Primary Examiner* — George B Bennett
(74) *Attorney, Agent, or Firm* — ScienBiziP, P.C.

(57) ABSTRACT

A flatness detector includes a positioning plate, a positioning assembly arranged on a top surface of the positioning plate, a dial indicator arranged on the positioning assembly, and a sliding block. The positioning assembly includes a first positioning rod and a second positioning rod perpendicularly coupled together and pin-jointed. The dial indicator includes a detecting post maintained as a plumb line by the positioning assembly. The sliding block defines a groove for conforming to the detecting post. A measurement value of the dial indicator is obtained when the groove of the sliding block is conformed to the detecting post.

12 Claims, 7 Drawing Sheets

FLATNESS DETECTOR

CROSS-REFERENCE TO RELATED APPLICATIONS

This application claims priority to Chinese Patent Application No. 201710866669.2 filed on Sep. 22, 2017, the contents of which are incorporated by reference herein.

FIELD

The subject matter herein generally relates to a measurement device, and more particularly to a flatness detector for measuring a flatness of a test piece relative to a reference surface.

BACKGROUND

Generally, a flatness of a component in a product is measured individually. When multiple components need to be measured, it may be required to use different flatness measuring devices having different structures.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
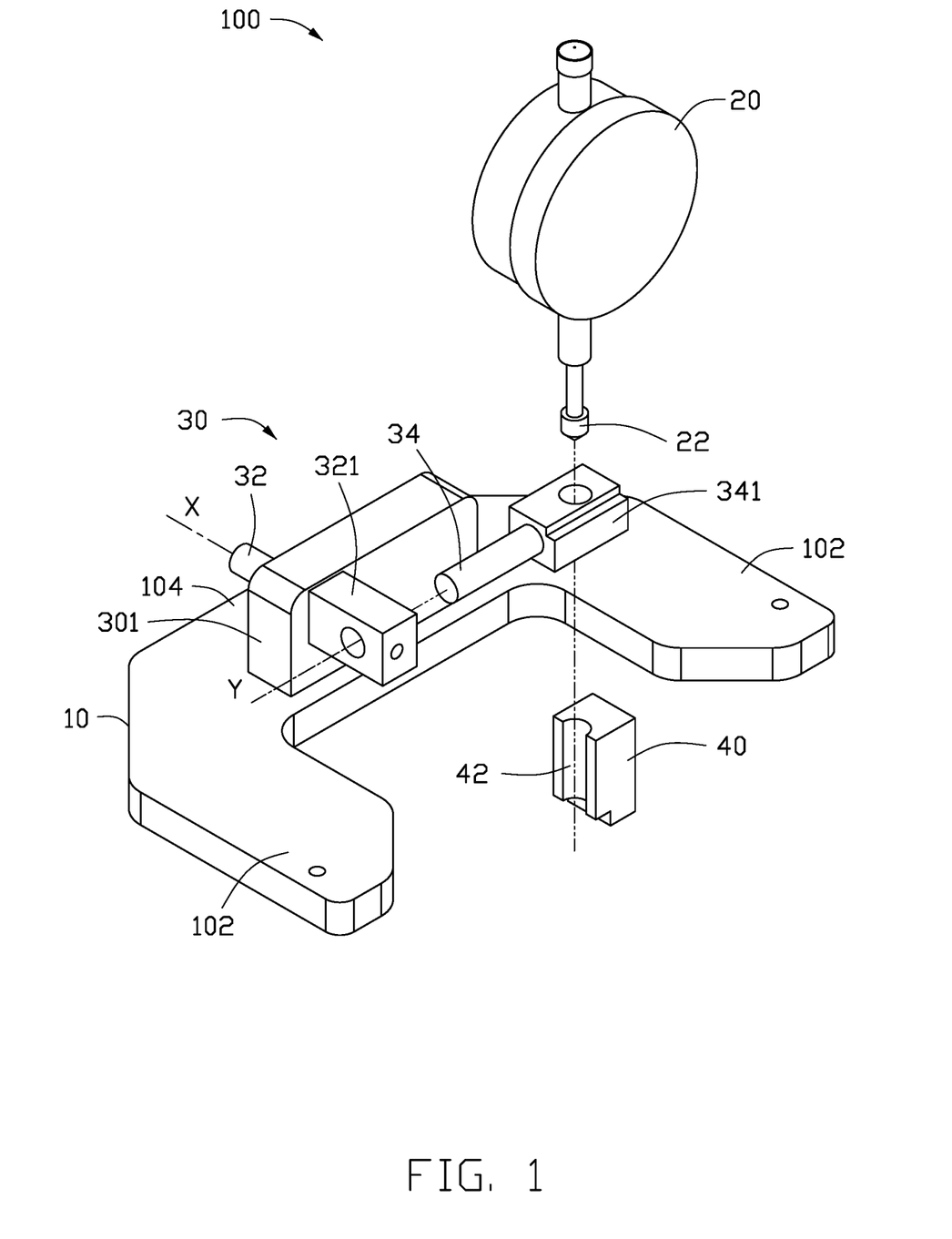
FIG. 1 is an exploded, isometric view of an exemplary embodiment of a flatness detector in accordance with an embodiment of the present disclosure.

FIG. 1 illustrates an embodiment of a flatness detector 100. The flatness detector 100 includes a positioning plate 10, a dial indicator 20, a positioning assembly 30, and a sliding block 40. The positioning assembly 30 is arranged on a top surface of the positioning plate 10. The dial indicator 20 is arranged on the positioning assembly 30. The positioning assembly 30 includes a first positioning rod 32 and a second positioning rod 34. The first positioning rod 32 and the second positioning rod 34 are substantially perpendicular and are pin-jointed. The dial indicator 20 includes a detecting post 22. The detecting post 22 is freely rotatable and maintained as a plumb line by the pin-jointed first positioning rod 32 and the second positioning rod 34. A groove 42 is defined in the sliding block 40. When the sliding block 40 is positioned to conform the groove 42 to the detecting post 22, a measurement value of the dial indicator 20.

Figure 2:
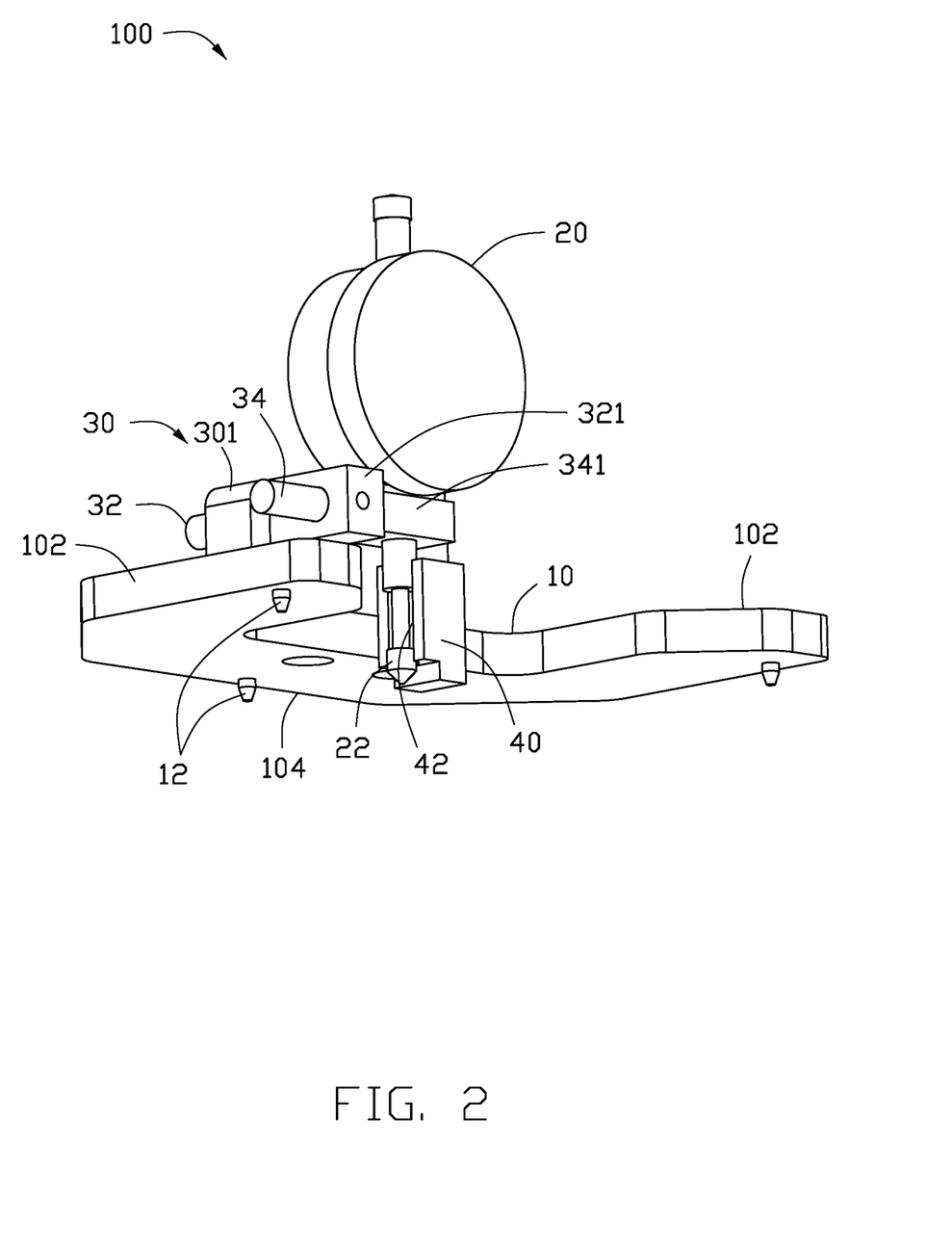
FIG. 2 is an assembled, isometric view of the flatness detector of FIG. 1, but shown from another angle.

Referring to FIG. 2, a bottom surface of the positioning plate 10 includes three support foots 12. The positioning plate 10 is substantially U-shaped and includes two side plates 102 and a connecting plate 104 between the two side plate 102. Each of the two side plates 102 and the connecting plate 104 has a corresponding one of the support foots 12 arranged on a bottom surface thereof. The three support foots 12 confirm a plane of the support plate 10.

The positioning assembly 30 is arranged on the connecting plate 104. A base 301 is arranged on a top surface of the connecting plate 104. The first positioning rod 32 is pin-joint coupled to the base 301 along a first direction X. The second positioning rod 34 is pin-joint coupled to the first positioning rod 32 along a second direction Y. The dial indicator 20 is arranged on the second positioning rod 34, such that the detecting post 22 is arranged at an inner side of the connecting plate 104 and pointed toward the positioning plate 10. The first direction X and the second direction Y are substantially perpendicular. The first positioning rod 32 is coupled to a first support base 321 along the first direction X. The second positioning rod 34 is pin-joint coupled to the first positioning rod 32 along the second direction Y through the first support base 321. The second positioning rod 34 is coupled to a second support base 341 along the second direction Y. The dial indicator 20 is coupled to the second support base 341 along the Y direction. Thus, the dial indicator 20 can be rotated along the first direction X and the second direction Y to maintain the detecting post 22 as a plumb line.

Specifically, the dial indicator 20 is arranged on the second support base 341. The dial indicator 20 follows the second positioning rod 34 pin-jointed along the second direction Y to adjust a position of the dial indicator 20 along the second direction Y. Similarly, the dial indicator 20 is arranged on the second support base 341. The second support base 341 follows the first positioning rod 32 of the first support base 321 pin-jointed along the first direction X to adjust a position of the dial indicator 20 along the first direction X. Thus, a position of the dial indicator 20 can be simultaneously adjusted along the first direction X and the second direction Y. The detecting post 22 passes through the second support base 341 to be located below the second support base 341 and is maintained as a plumb line. When the flatness detector 100 measures flatness, the positioning plate 10 confirms a plane, and the positioning assembly 30 causes the detecting post 22 to point toward a test surface. The sliding block 40 is used to conform the groove 42 to the detecting post 22, the measurement value can be read from the dial indicator 20 to confirm a flatness of the test surface, and a position relationship between the positioning plate 10 and the test surface is confirmed. In at least one embodiment, the groove 42 is substantially a curved surface, and the detecting post 22 is substantially a round column.

Figure 3:
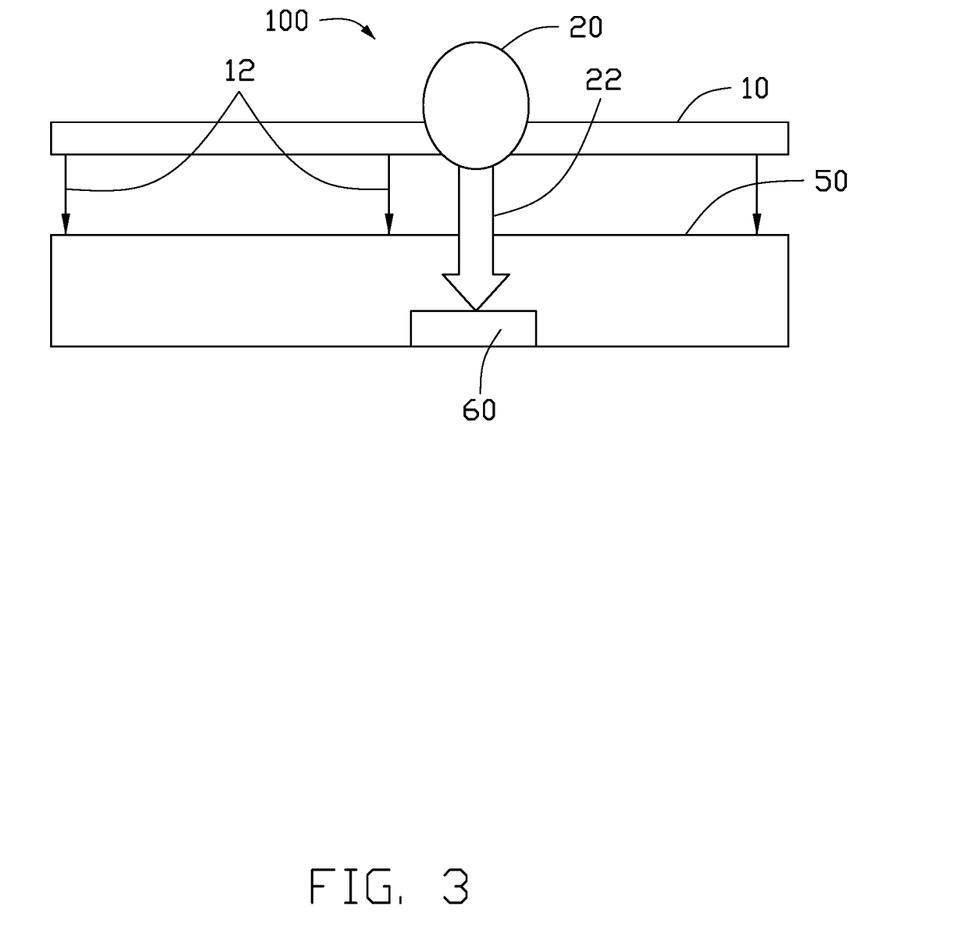
FIG. 3 is a diagram of a positioning plate of the flatness detector supported on a plane by three support foots.
Figure 4:
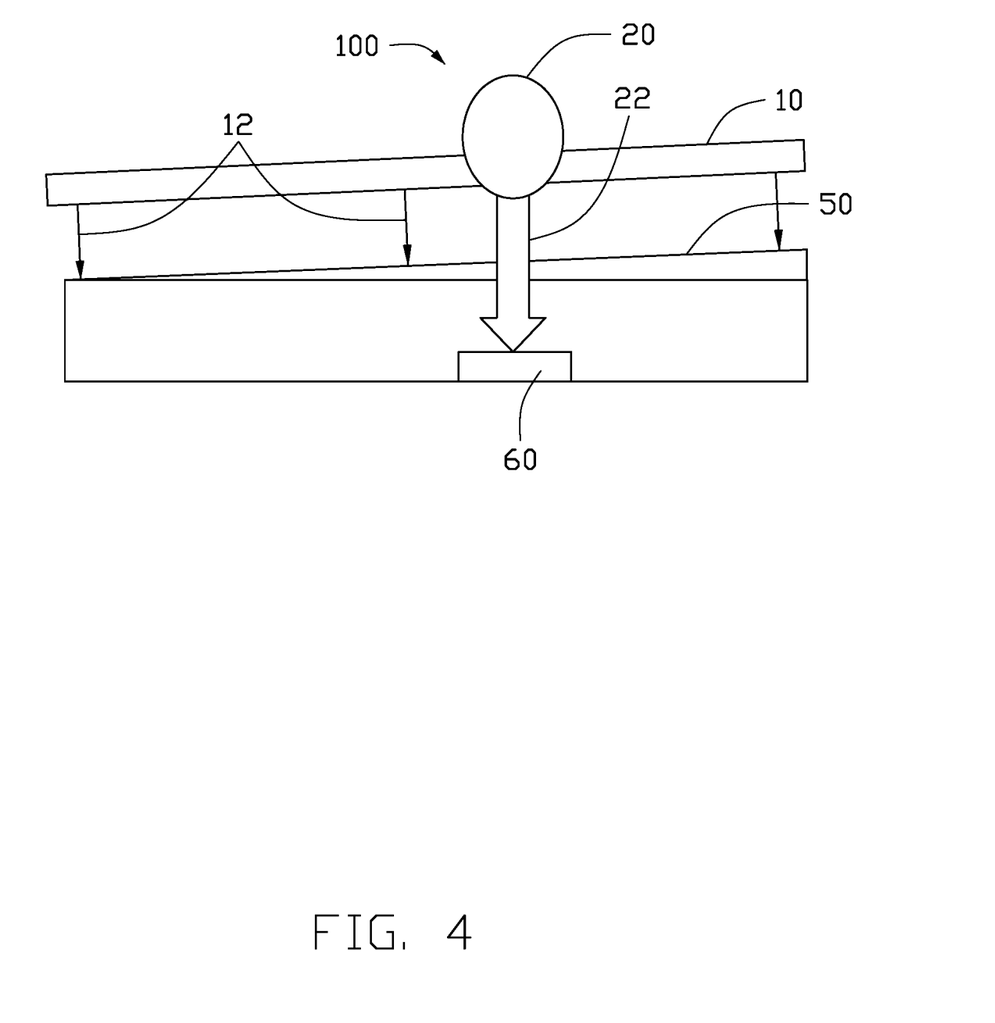
FIG. 4 is a diagram of the positioning plate supported on an inclined plane by three support foots.

Referring to FIG. 3, the three support foots 12 of the positioning plate 10 are arranged on a surface 50 to make the positioning plate 10 correspond to the surface 50. The detecting post 22 is maintained as a plumb line by the positioning assembly 30. When the detecting post 22 and the positioning plate 10 are perpendicular to each other, the positioning plate 10 and the surface 50 are parallel to each other. When the surface 50 is a standard surface (is a standard flatness), the surface 50 is a reference surface, and the reference surface is used to set a measurement value of the dial indicator 20 to zero. After the dial indicator 20 is set to zero, the detecting post 22 measures a flatness of a test surface 60, and a flatness value of the test surface 60 is read from the dial indicator 20. In addition, a position relationship including a distance and an offset between the test surface 60 and the surface 50 is confirmed. On the other hand, when the surface 50 is not a standard surface and is inclined, the detecting post 22 is maintained as a plumb line, the detecting post 22 and the positioning plate 10 are not perpendicular to each other, and a measurement value is read from the dial indicator to obtain an inclination state of the surface 50 (as shown in FIG. 4).

Figure 5:
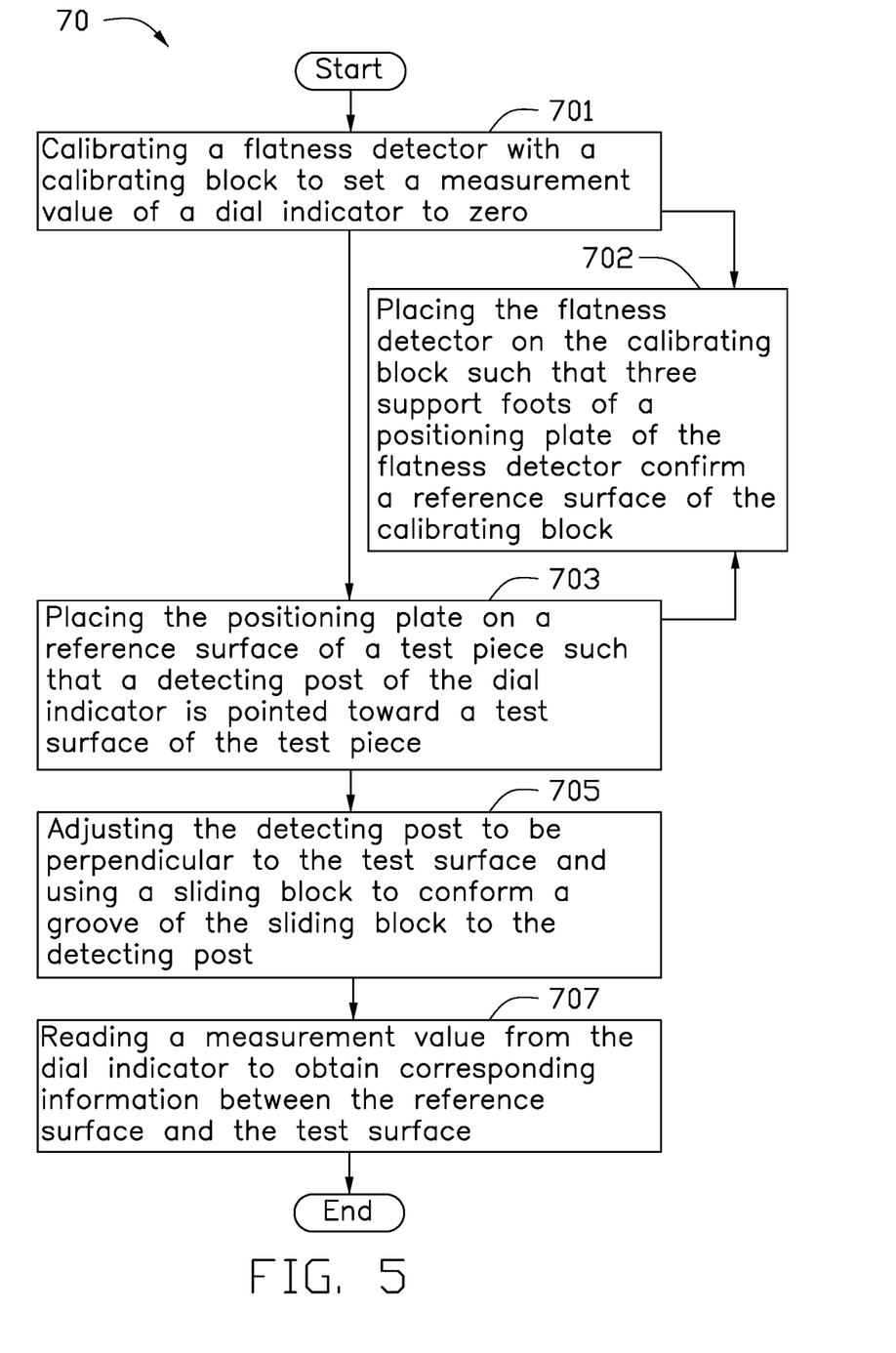
FIG. 5 is a flowchart diagram of an exemplary method for using the flatness detector.

FIG. 5 illustrates a flowchart of an exemplary method for using a flatness detector. The example method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 700.

At block 701, the flatness detector 100 is calibrated with a calibrating block 80 (shown in FIG. 6) to set a measurement value of the dial indicator 20 to zero.

At block 703, a positioning plate 10 is placed on a reference surface 92 of a test piece 90 (shown in FIG. 7), and the detecting post 22 of the dial indicator 20 is pointed toward a test surface 94 of the test piece 90.

At block 705, the detecting post 22 is adjusted to be perpendicular to the test surface 94, and the sliding block 40 is used to conform the groove 42 to the detecting post 22.

At block 707, a measurement value is read from the dial indicator 20 to obtain corresponding information between the reference surface 92 and the test surface 94.

Figure 6:
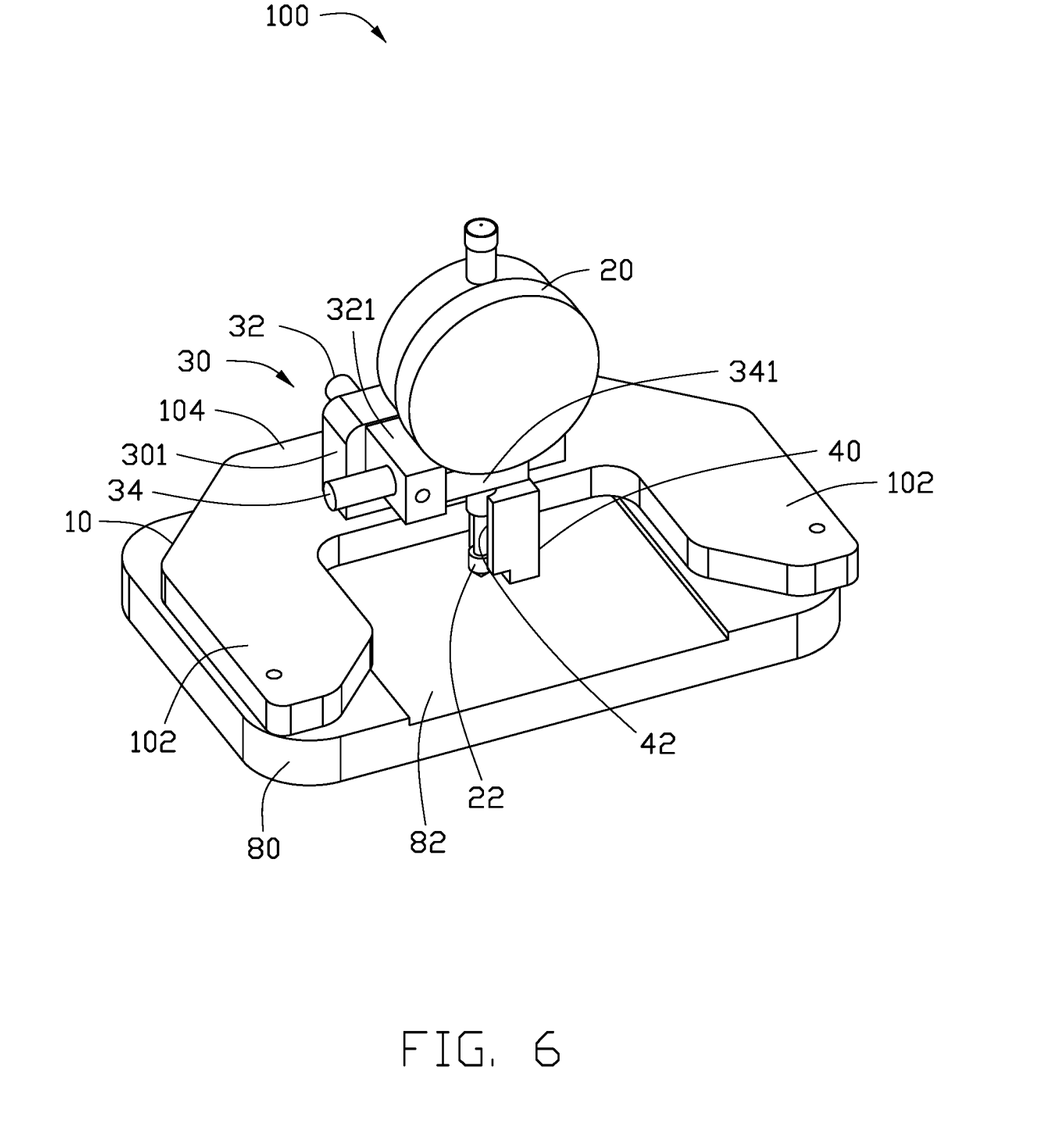
FIG. 6 is an isometric diagram of the flatness detector being calibrated with a calibrating block.

Referring to FIG. 6, according to block 701, the flatness detector 100 is calibrated by first placing the flatness detector 100 on a reference surface 82 of the calibrating block 80. The three support foots 12 of the positioning plate 10 confirm a plane of the reference surface 82. Then, the sliding block 40 is used to conform the groove 42 to the detecting post 22, and the measurement value of the dial indicator 20 is set to zero. In other words, using the sliding block 40 to conform the groove 42 to the detecting post 22 causes the detecting post 22 to be perpendicular to the reference surface 82, and the reference surface 82 is parallel to the positioning plate 10. Thus, the measurement value of the dial indicator 20 is set to zero, and the flatness detector 100 is calibrated.

Block 707 includes a sub-block 702.

At block 702, the flatness detector 100 is placed on the calibrating block 80 such that the three support foots 12 of the positioning plate 10 confirm the reference surface 82 of the calibrating block 80, and the measurement value of the dial indicator 20 is set to zero.

Figure 7:
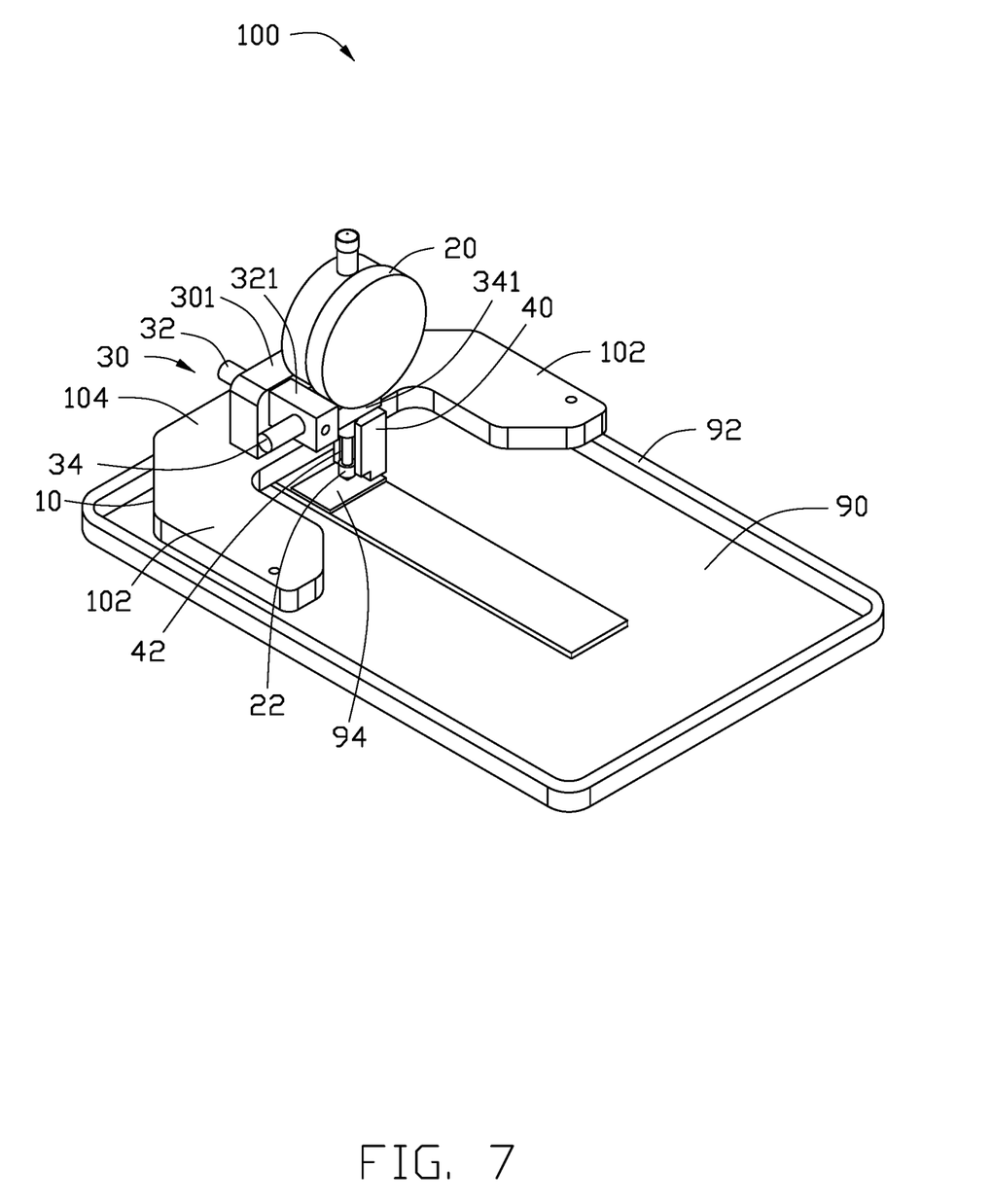
FIG. 7 is an isometric diagram of the flatness detector measuring a test piece.

Referring to FIG. 7, at block 703, the calibrated flatness detector 100 is set on the test piece 90. In at least one embodiment, the test piece 90 is a casing of a mobile phone. The reference surface 92 of the casing is the sidewall of the casing, and the test surface 94 is a surface of a component located on a base of the casing. The flatness detector 100 is set on the casing such that the three support foots 12 are supported on the sidewall of the casing, thereby confirming the reference surface 92. The detecting post 22 is perpendicular to the test surface 94. The sliding block 40 is used to conform the groove 42 to the detecting post 22. Since the dial indicator 20 has been set to zero, when the groove 42 is conformed to the detecting post 22, the measurement value is read from the dial indicator 20 to obtain information between the reference surface 92 and the test surface 94. The information includes a height difference, a shortest distance, and a flatness offset between the reference surface 92 and the test surface 94.

The flatness detector 100 uses the perpendicularly arranged and pin-jointed positioning assembly 30 to support the dial indicator 20, thereby maintaining the detecting post 22 as a plumb line. Thus, the flatness detector 100 can quickly and accurately measure a test piece with high efficiency and low errors.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A flatness detector comprising:
   a positioning plate;
   a positioning assembly arranged on a top surface of the positioning plate, the positioning assembly comprising a first positioning rod and a second positioning rod perpendicularly coupled together and pin-jointed;
   a dial indicator arranged on the positioning assembly, the dial indicator comprising a detecting post maintained as a plumb line by the positioning assembly; and
   a sliding block defining a groove for conforming to the detecting post;
   wherein a measurement value of the dial indicator is obtained when the groove of the sliding block is conformed to the detecting post.

2. The flatness detector of claim 1, wherein the positioning plate comprises three support foots arranged on a bottom surface of the positioning plate; the three support foots support the positioning plate on a plane.

3. The flatness detector of claim 2, wherein the positioning plate is U-shaped and composed of two side plates and a connecting plate connecting the two side plates; the two side plates and the connecting plate each have a corresponding one of the three support foots arranged thereon.

4. The flatness detector of claim 3, wherein the positioning assembly is arranged on the connecting plate; the connecting plate comprises a base; the base pin-joint couples the first positioning rod along a first direction; the first positioning rod pin-joint couples the second positioning rod along a second direction.

5. The flatness detector of claim 4, wherein the dial indicator is arranged on the second positioning rod; the detecting post is arranged at an interior of the U-shaped positioning plate and points toward the positioning plate.

6. The flatness detector of claim 5, wherein the first direction and the second direction are perpendicular to each other; the first positioning rod is coupled to a first support base along the first direction; the second positioning rod is pin-joint coupled to the first support base along the second direction; the second positioning rod is coupled to a second support base along the second direction.

7. The flatness detector of claim 6, wherein the dial indicator is coupled to the second support base along the second direction; the dial indicator adjusts the detecting post along the first direction and the second direction to maintain the detecting post as a plumb line.

8. The flatness detector of claim 7, wherein the dial indicator is arranged on a top surface of the second support base; the detecting post passes through the second support base and is located below the second support base.

9. The flatness detector of claim 8, wherein the groove is a curved surface; the detecting post is a round column; the measurement value is read from the dial indicator when the groove completely conforms to the detecting post.

10. A method for using a flatness detector, the method comprising:
   using a calibrating block to calibrate a flatness detector to make a measurement value of a dial indicator return to zero value;
   placing a positioning plate of the flatness detector on a reference surface of a test piece and positioning a detecting post of the flatness detector on a test surface of the test piece;
   adjusting the detecting post to be perpendicular to the test surface and conforming a groove of a sliding block to the detecting post; and
   reading a measurement value of the dial indicator to obtain corresponding information between the reference surface and the test surface.

11. The method of claim 10, wherein the positioning plate comprises three support foots on a bottom surface thereof; and the step of using the calibrating block to calibrate the flatness detector comprises placing the positioning plate with the three support foots on a reference surface of the calibrating block.

12. The method of claim 11, wherein the reference surface of the test piece is confirmed by placing the positioning plate with the three support foots on the reference surface of the test piece.

* * * * *